W. CHIPPERFIELD.

TYPE CASE.

APPLICATION FILED JULY 1, 1910.

14,043

Reissued Jan. 11, 1916

3 SHEETS—SHEET 1.

WITNESSES

W. P. Burke

Lawrence Hajek

INVENTOR

Walter Chipperfield

By Thos Macleay White

Atty.

W. CHIPPERFIELD.

TYPE CASE.

APPLICATION FILED JULY 1, 1910.

14,043

Reissued Jan. 11, 1916

3 SHEETS—SHEET 2.

WITNESSES
W. P. Burke
Lawrence Hajek

INVENTOR
Walter Chipperfield
BY Wm Macrae White
ATTY.

W. CHIPPERFIELD.

TYPE CASE.

APPLICATION FILED JULY 1, 1910.

14,043

Reissued Jan. 11, 1914

3 SHEETS—SHEET 3.

WITNESSES

W. P. Burns

Lawrence Hajek

INVENTOR

Walter Chipperfield

BY Mr Nathan White

ATTY.

UNITED STATES PATENT OFFICE.

WALTER CHIPPERFIELD, OF ROMFORD, ENGLAND.

TYPE-CASE.

14,043. Specification of Reissued Letters Patent. Reissued Jan. 11, 1916.

Original No. 983,350, dated February 7, 1911, Serial No. 569,928. Application for reissue filed February 7, 1913. Serial No. 746,962.

*To all whom it may concern:*

Be it known that I, WALTER CHIPPERFIELD, a subject of the King of Great Britain, residing at Romford, Essex, England, have invented new and useful Improvements in Type-Cases, of which the following is a specification.

This invention relates to improvements in and relating to type cases, and it refers particularly to cases for the reception of type designed for use with type carriers or chases in which the type retaining bars are provided with longitudinal slots engaged by projections upon the type. These type projections may be caused by grooves in the opposite sides of the type and the type case has rails with overhanging edges which may loosely enter such grooves.

The present invention has for its object to provide an improved construction and arrangement of type case whereby the type may be conveniently and rapidly distributed into the case and assembled from it as desired, and whereby the capacity of the case may be readily increased in order to permit it to accommodate a greater quantity of type.

In order that the invention may be the better understood, drawings are appended in which:—

Figure 1:
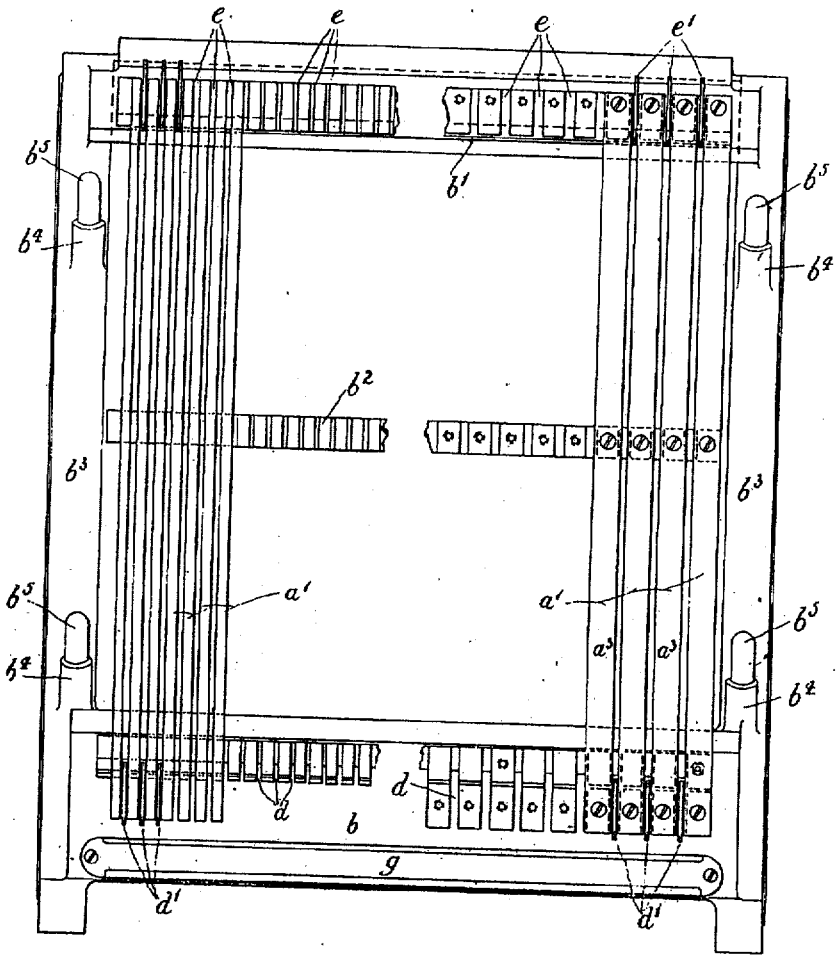
Figure 2:
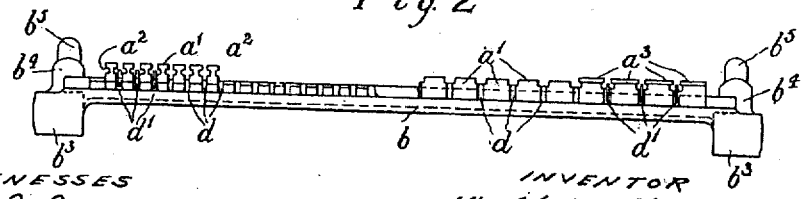
Figure 3:
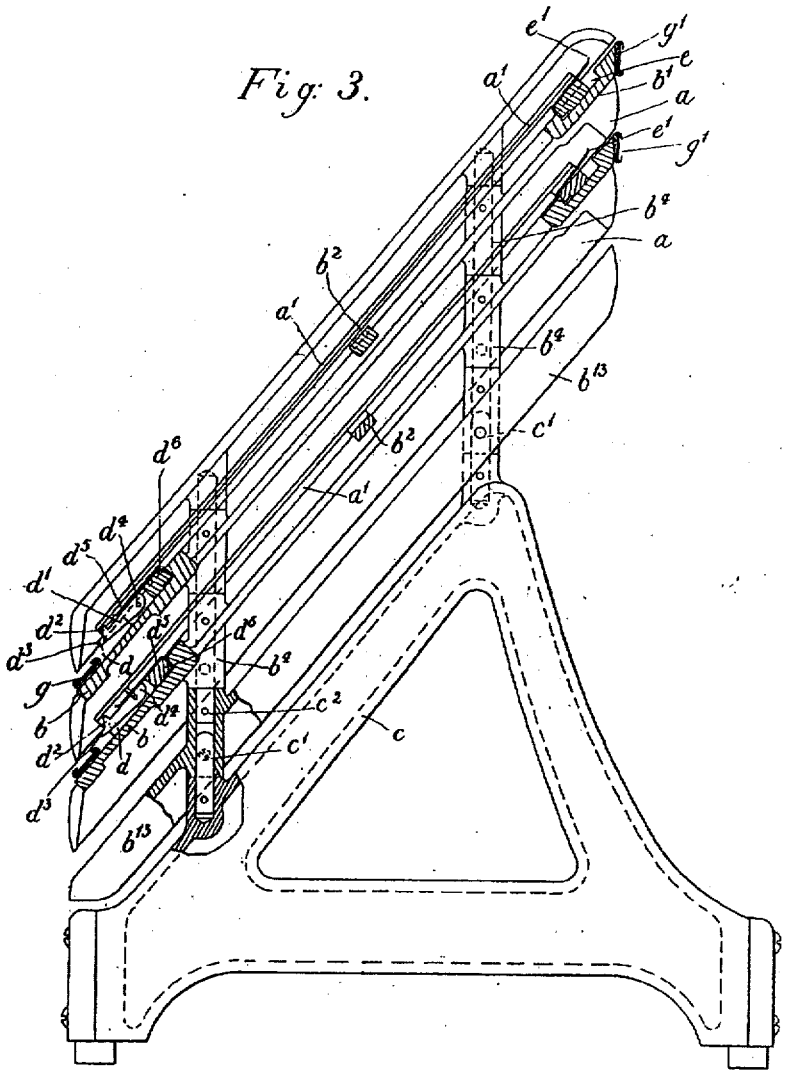
Figure 4:
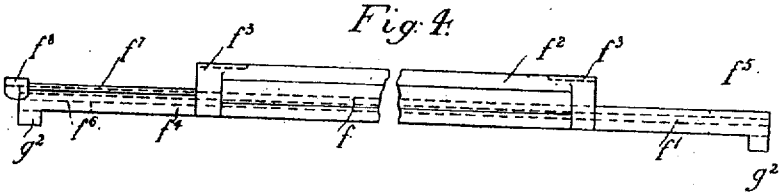
Figure 5:
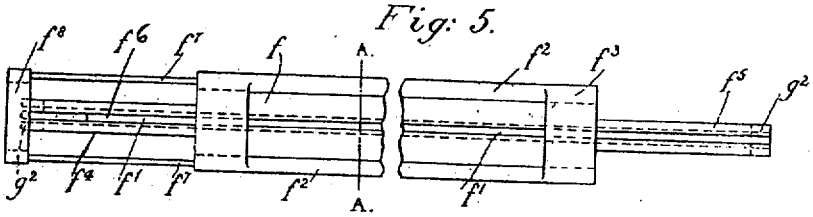
Figure 6:
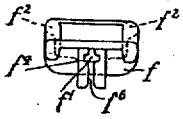
Figure 7:
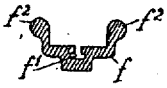
Figure 8:
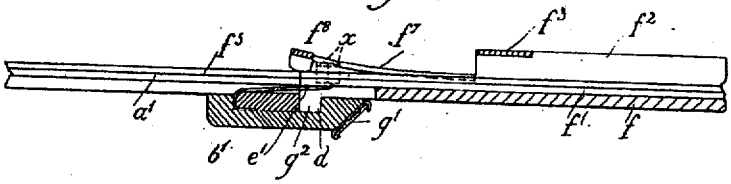
Figure 9:
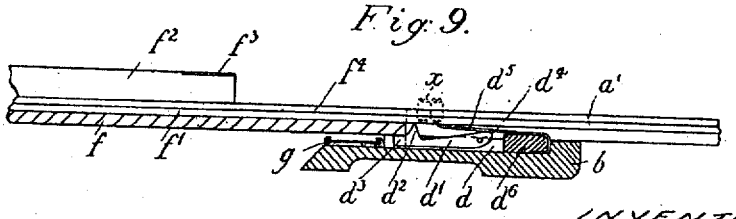

Figure 1 is a front elevation of a type case constructed in accordance with the present invention; Fig. 2 is an end view of one of the sections comprising the case; Fig. 3 is a side elevation partly in section; Fig. 4 is a side view of the composing stick; Fig. 5 is a plan; Fig. 6 is an end view of the composing stick; Fig. 7 is a transverse section on line A A Fig. 5; Fig. 8 is a side view partly in section showing the upper end of one of the frames with the type being transferred from the composing stick to the case; Fig. 9 is a similar view showing the type being transferred from the case to the composing stick.

A type case constructed in accordance with the present invention comprises a number of supports for banks of type indicated generally by $a$, the supports being superposed and inclined at such an angle to the horizontal as will cause the type therein to slide in the type carrying bars by gravity. Each bank comprises a series of type bars $a'$ slotted at $a^2$ and so pitched or spaced as to permit the type to slide readily between them, the said type being supported by projections which engage the slots $a^2$ aforesaid and which are formed in the sides of the bars $a'$. The bars $a'$ are formed integral with, or they may be formed separated from and be secured in any suitable manner to the transverse members $b$, $b'$, $b^2$ Figs. 1, 2 and 3, the transverse members $b$, $b'$ being attached to side members $b^3$. The members $b^3$ are disposed at a right angle to the members $b$, $b'$, $b^2$ and formed upon members $b^3$ $b^3$ are bosses $b^4$ which project from the upper and lower faces of the said members and which bosses are bored to form sockets designed to receive the pins $b^5$ which are secured in the upper ends of the bosses in any suitable manner. The lower ends of each of the bores of the bosses are left free so that when superposed the projecting pins may enter the said bores and the supports be supported one upon the other as shown in Fig. 3. The lowermost support is supported upon a frame $c$ having projecting pins $c'$ designed to engage the sockets on the bottom section $b^{13}$ having bosses thereon and pins $c^2$ engaging the sockets on the said lowermost support.

Although as aforesaid the type carrying bars $a'$ may be slotted to receive the projections on the sides of the type, I may in some instances (particularly where larger type are to be carried) employ bars such as those shown to the right of Figs. 1 and 2, in which case the said bars are of inverted T shaped cross sectional outline and the channels therein are formed by securing to the upper edges thereof flat bars $a^3$.

$d$, Figs. 1, 2, 3 and 9, indicates slots, or recesses formed in the lower transverse member $b$ of the supports $a$ and within each of which slots is pivotally mounted a catch comprising a lever $d'$, having at its lower or outer end a hook shaped portion $d^2$ provided with an extension $d^3$. The opposite end of the lever is provided with an extension or shoulder $d^4$. The lever $d'$ is under the influence of a spring $d^5$ by which it is caused to normally occupy a position such that the hook shaped extremity normally lies in the path of the type, the said extremity thus forming a stop against which the lowermost type abuts and which stop is depressed when the type is required to be removed. The spring $d^5$ acts upon the end $d^4$ as shown in Figs. 3 and 9, so that the depression of the outer end of the lever is opposed by the said spring. The spring $d^5$ is conveniently secured by means of a bar $d^6$ around which the end of the spring is bent and the bar itself is secured in a recess formed in the transverse member $b$ by means of screws.

$e$, Figs. 1, 3 and 8, indicates recesses formed in the transverse member $b'$, a recess being disposed at the end of each of the type channels. Arranged within each recess is a spring $e'$ secured in the same manner as the spring $d^5$ already referred to, that is to say, the springs $e'$ may have their lower ends bent around a bar $e^2$ occupying a transverse groove in the frame member $b'$. The spring $e'$ projects beyond the end of the type way, as shown, and, as will be presently described, it enters the type way on the composing stick and holds the main body of the type back while the first type is being transferred to the case.

The composing stick as shown in Figs. 4 to 9 comprises a channeled body $f$ presenting a cross section as shown in Fig. 7, having formed in it a type way $f'$ in which the type are assembled. The stick is provided with tubular or solid side members $f^2$ connected at each end by transverse members $f^3$ and it has at each end channeled extensions $f^4$ $f^5$, the extension $f^4$ being slotted at $f^6$ as shown in the drawings Figs. 4, 5, 6 and 8. Secured in any suitable manner to the ends of the members $f^2$ are the ends of springs $f^7$, to the outer ends of which is secured a bridge piece $f^8$ which normally forms a gate for the end of the type way and prevents the passage of the type when the stick is inclined or held in a vertical position. The ends of the composing stick are each provided upon the underside with projections $g^2$ which, when the stick is in use, are caused to engage recesses in the respective upper and lower transverse members of the support for the bank so that the type channels in the support for the bank and the composing stick are in proper alinement.

In use when composing the type, the end of the composing stick is placed in alinement with the particular channel in the support for the bank containing the desired letter or character to be transferred to the stick. When the end of the stick is placed in position it comes into contact with the extension $d^3$ on the lever $d'$ in Fig. 9. The lever is thus depressed against the action of the spring $d^5$ and the projection thereon is withdrawn, thereby allowing a clear passage for the type which thereupon is free to slide into the type way of the composing stick. When the parts are in the position just described, the end of the spring $d^5$ is raised by the depression of the lower end of the lever $d'$ and bears against the under side of the second type within the case as shown and which type is thus held against movement and forms a stop preventing the movement of the rest of the type until such time as the composing stick is removed and the type free to slide until checked by the projection on the lever $d'$.

When the type is distributed the opposite end of the composing stick is placed in position opposite the type channel in the case proper to the particular letter or character which, at the time, is at the end of the stick, the legs $g^2$ properly centering the stick when so placed. In placing the stick in position the gate at the end of the stick is raised and the type way is clear for the passage of the type. Simultaneously with the raising of the gate the end of the spring $e'$ comes into contact with the under side of the second type in the stick and presses same upward so that it is not only held against movement itself, but is held with sufficient firmness to prevent it from being pushed out by the weight of the type behind it. The outermost type falls by gravity into its type way in the case. In order to facilitate the distribution or setting up of the type, an index may be provided at each end of the bank, as shown at $g$ and $g'$ in Figs. 1, 3, 8 and 9.

Obviously, with the case constructed in accordance with the present invention, the capacity of the said case may be varied as desired and various kinds of type may be assembled in one frame. Again, the distribution and setting up of the type may be performed with a minimum of labor and with much greater certainty than with cases and sticks in which the type are assembled by hand.

Obviously, the means of connection for respective banks is capable of considerable variation, as also the minor details of construction of the different parts.

Having thus described my invention, what I claim is:

1. In a type case, the combination of a series of parallel overhanging rails providing channels down which type having grooves occupied by the rail edges may pass by gravity, movable stops at the lower ends of the respective channels normally in line with the type therein but adapted to be moved to release the type, and spring means automatically and yieldingly engaging the foot of the next to the bottom type when the stop is moved to release the bottom type.

2. In a type case, the combination of a series of parallel overhanging rails providing channels down which type having grooves occupying the rail-edges may pass by gravity, movable stops at the lower ends of said channels, each in the form of a pivoted lever having a shoulder normally engaging the lowermost type in the channel, and a spring automatically forced into engagement with the foot of the next to the bottom type in each channel when the lever thereof is moved to free the bottom type, each lever having a downward extension adapted to be engaged to move it rearwardly.

3. In a type case, the combination of a series of parallel overhanging rails providing channels down which type having grooves occupied by the rail-edges may pass by gravity, movable stops at the lower ends of the respective channels normally in line with the type therein but adapted to be moved to release the type, springs, one for each type channel, and means for automatically moving them into engagement with the foot of the next to the bottom type respectively when the stop is moved to free the corresponding bottom type.

4. In a type case, the combination of a series of channels side by side having means for loosely confining type grooved on its opposite sides, a series of levers pivotally mounted behind said channels near their lower ends, forwardly projecting shoulders on said levers adapted to engage beneath the bottommost type in the channels, normally idle springs standing behind the next to the bottom type in the respective channels, there being a shoulder on each lever adapted to force the corresponding spring forwardly when the lever is shoved rearwardly, whereby the next to the bottom type is engaged when the bottom type is freed.

5. In a type case, the combination, with a series of parallel overhanging rails, of a series of intermediately pivoted levers mounted adjacent to the lower ends of said rails and having forwardly projecting shoulders extending between the rails, a series of springs mounted behind the channels between the rails near their lower ends and overlapping the upper ends of the levers, such upper ends of the levers constituting shoulders adapted to force forwardly the springs when the levers are shoved rearwardly.

6. In a type case, the combination of a series of banks, means for removably holding them in parallel inclined position one directly above the other, each bank being provided at its lower end with a series of downwardly and rearwardly movable levers having stopping shoulders, the lower ends of said levers being accessible at the front of the case, and means for yieldingly engaging the foot of the next to the bottom type in any channel when its lever is pressed rearwardly to release the bottom type.

7. In a type case, the combination of a series of parallel channels, a series of members adjacent to the upper ends of the channels adapted to engage the next to the bottom type in a stick contiguous to the upper end of the channel, whereby type may be fed into the channel by a stick having a gate controlling the release of the bottom type therein.

8. In a type case, the combination of a series of parallel channels open at their upper ends, and a series of springs mounted behind such upper ends and projecting upwardly in a position to engage the foot of a type in a line alined with the corresponding channels, and means for centering a portable distributing stick holding such line in alinement with such channel.

9. In a type case, the combination of a series of channels down which the type may slide, intermediately pivoted levers having projections below their pivots adapted to form stops for such type, and leaf springs anchored at one end and overhanging the upper ends of the levers and having free ends behind the next to the bottom type, each spring performing the double function of normally holding the corresponding lever in active position and of itself constituting a stop to engage the next to the bottom type when the lever is moved to free the bottom type.

10. In a type case, the combination of a series of parallel bars providing between them channels down which grooved type may slide while being held in the case, a series of intermediately pivoted levers behind their respective channels having forwardly projecting shoulders below their pivots adapted to extend beneath the bottommost type, said levers extending above their pivots, and a series of leaf springs anchored at their upper ends and extending downwardly across the upper ends of the levers and having their free ends a distance above said shoulders greater than the thickness of one type and less than the thickness of two type, whereby said springs may perform the double function of normally holding the levers in active position, and when the levers are moved to inactive position constituting stops yieldingly engaging the next to the bottom type.

11. The combination of a type channel provided by a pair of parallel rails with their edges projecting toward each other, a pivoted lever mounted behind the channel adjacent to its lower end and having a forwardly projecting shoulder adapted to engage the lowermost type, said lever projecting above its pivot, and a normally idle leaf spring overhanging such projection and standing behind the next to the bottom type, said spring serving the double purpose of holding the lever normally in engaging position and of being moved by the lever to engage the next to the bottom type when the lever is moved to free the bottom type, said lever having a downward extension by which it may be so moved.

12. A type case comprising a plurality of inclined supports for banks of type each having a pin and socket connection whereby they are supported one on the other, spring controlled means at one end of each typeway adapted to be actuated by a composing stick for releasing the end type and holding back the second of said type when composing, and spring actuated means at the other end for holding the second type in a composing stick when distributing.

13. A type case comprising a plurality of inclined supports for banks of type each formed of a number of bars having typeways in their adjacent faces, a pin and socket connection whereby the supports are supported one on the other, spring controlled means at one end of each typeway adapted to be actuated by a composing stick for releasing the end type and holding back the second of said type when composing, and spring actuated means at the other end for holding the second type in a composing stick when distributing.

14. A type case comprising a plurality of inclined banks of type each formed of a number of bars having typeways in their adjacent faces, said bars being supported by intermediate and end supports arranged at a right angle to the lines of the bars and connected to end members parallel with said bars, pin and socket connection upon the end members whereby the banks are supported one on the other, spring controlled means at one end of each typeway adapted to be actuated by a composing stick for releasing the end type and holding back the second of said type when composing, and spring actuated means at the other end for holding a second type in a composing stick when distributing.

15. A type case comprising a plurality of inclined banks of type each formed of a number of bars having typeways in their adjacent faces, a catch located at one end of each of the typeways, a spring member actuated by said catch and designed to lock the second type within the typeways, said catch being adapted to be actuated by the end of a composing stick when same is positioned to receive the type, a spring at the opposite end of the type way for holding back the second type within a composing stick when the same is positioned to discharge the type into the case.

In testimony whereof, I hereunto affix my signature in the presence of two witnesses.

WALTER CHIPPERFIELD.

Witnesses:

HARRY S. BRIDGE,

PERCY HEWITT.

Copies of this patent may be obtained for five cents each, by addressing the "Commissioner of Patents, Washington, D. C."